Dec. 19, 1933.  L. SCHILLING  1,940,564
SANDWICH FILLING DEVICE
Filed Jan. 30, 1932
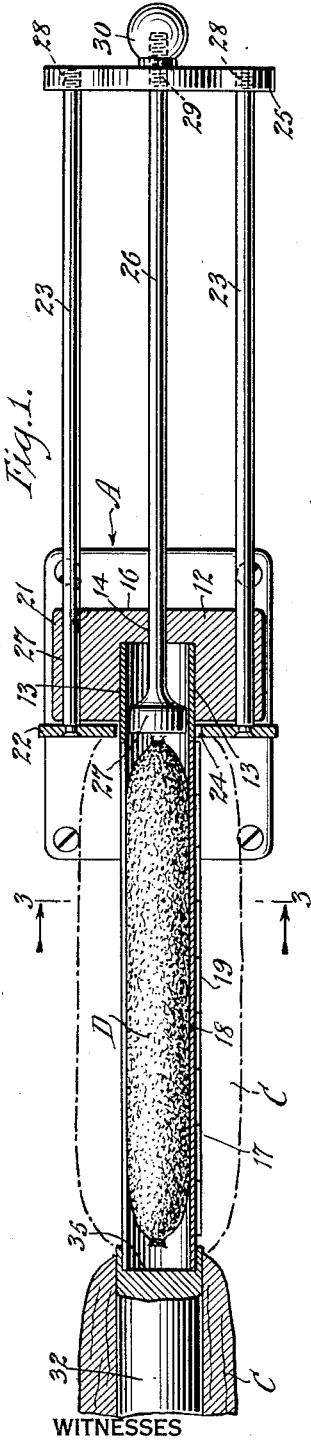
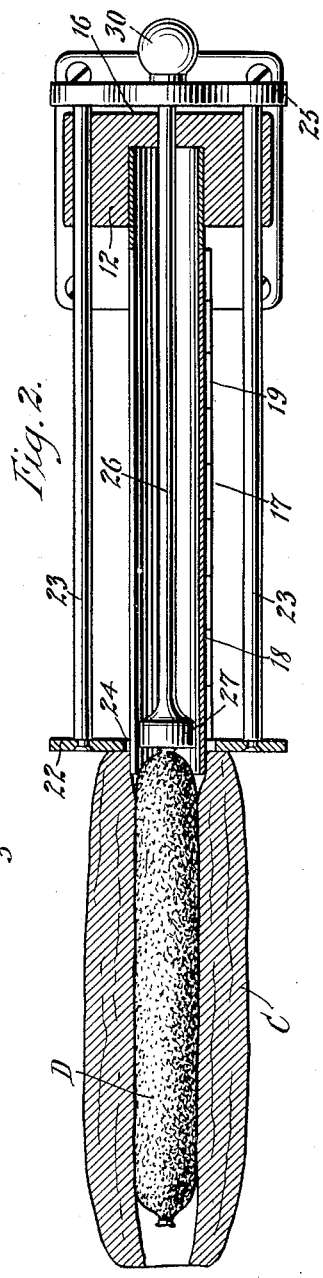
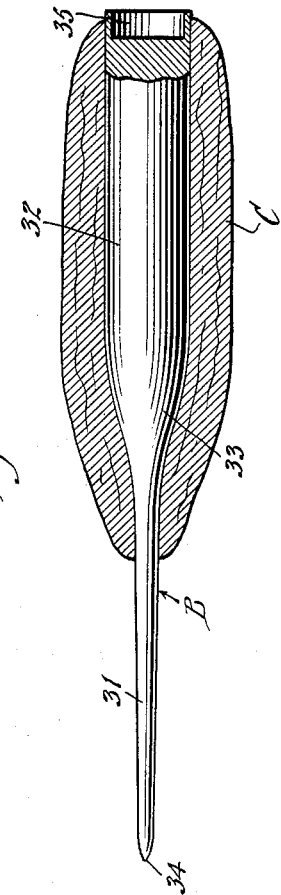
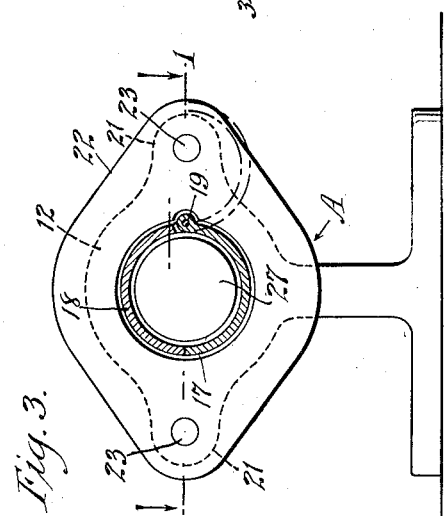
INVENTOR
Louis Schilling
BY
ATTORNEY Patented Dec. 19, 1933

1,940,564

UNITED STATES PATENT OFFICE 1,940,564

SANDWICH FILLING DEVICE

Louis Schilling, Valley Stream, N. Y.

Application January 30, 1932. Serial No. 589,872

5 Claims. (Cl. 107—1)

This invention relates to a sandwich making device, and has more particular reference to an apparatus for facilitating the making of roll sandwiches, and especially frankfurter and roll sandwiches.

Heretofore, sandwiches of this character have been commonly made by splitting the roll longitudinally and placing the frankfurter or analogous filling between the split sections.

It is a well appreciated fact that this practice does not make for a highly satisfactory product, in that the sandwich thus produced in bulky, unsightly and difficult to handle and eat, due mainly to the fact that a filling of this nature does not intimately fit between the split sections of the roll.

The present invention, therefore, aims to provide an apparatus of the indicated character which includes means for forming a hole or opening extending longitudinally of the roll, together with means for facilitating the emplacement of the frankfurter or filling in said hole.

The invention further contemplates a device for making sandwiches which includes a tubular element adapted to receive therein the sandwich filling and adapted to receive thereover a roll or equivalent which is provided with a longitudinally extending opening for the reception of the filling, together with means movable longitudinally of the tubular element interiorly and exteriorly thereof for simultaneously displacing the roll and filling from the tubular element and thereby effecting the emplacement of the filling within the roll during its displacement from said element.

The invention furthermore embraces a spearing element consisting of a shank which is so constructed or fashioned as to facilitate the formation of the longitudinal opening in the roll and the displacement of the roll therefrom and positioning of the same over the tubular element which receives the sandwich filling.

Other objects of the invention reside in the provision of a device or apparatus of the character set forth which is comparatively simple in its construction, inexpensive to manufacture, capable of being readily cleansed to render it sanitary and which is highly efficient in its purpose.

With the above recited and other objects in view, reference is had to the following description and accompanying drawing, in which there is exhibited one example or embodiment of the invention, while the claims define the actual scope of the same.

In the drawing:

Figure 1 is a sectional plan view illustrating the roll and filling in juxtaposition to the device.

Figure 2 is a similar view thereof illustrating the roll and filling immediately prior to the final displacement of the same from the device.

Figure 3 is a transverse sectional view taken approximately on the line 3—3 in Figure 1.

Figure 4 is a view illustrating in juxtaposition the roll and the device forming the filling receiving opening therein.

Referring to the drawing by characters of reference, A designates generally the device for emplacing the filling in the roll, and B the device for forming the opening through the roll for accommodating the filling.

The device A includes a base 10 which may be secured or anchored to a horizontal supporting surface, such as a table or counter, by means of screws or other equivalent fastening devices 11. The base is provided with an upstanding stock 12 which is formed with horizontally disposed communicating concentric bores 13 and 14 opening respectively through the front and rear faces 15 and 16 of the stock. The bore 13 is of greater diameter or cross sectional size than the bore 14 and is designed to have snugly fitted and secured therein one end of a tube 17 which projects horizontally from the front face 15 of the stock and the projecting portion of which tube is of a length approximating or slightly exceeding that of the average frankfurter roll. The projecting portion of the tube 17 from a point slightly beyond the front face 15 of the stock to the outer open free end is formed with an upper semi-cylindrical displaceable or relatively movable section 18 which is preferably connected along one side edge to the corresponding side edge of the stationary section 17 of the tube by a hinge 19. The stock 12 is further provided with a pair of laterally spaced longitudinally extending bearing openings 20 which are preferably formed in lateral enlargements or bosses 21. An ejector plate 22 is carried by a pair of rods 23 which are slidably mounted in the bearing openings 20, the said ejector plate having an opening 24 to accommodate therethrough the tube 17. The ejector plate is normally disposed in front of the front face 15 of the stock 12, between said front face 15 and the rear of the rear edge of the displaceable or relatively movable section 18, and the rods 23 project rearwardly from the rear face 16 of the stock and are connected to a cross head 25, the rods 23 being of such a length that when the cross head engages with the rear face 16 of the stock, the ejector plate 22 will be disposed at outer end of the tube 17. The cross head has secured thereto and projecting forwardly therefrom an intermediate plunger rod 26 which extends through the reduced bore and has secured to its forward end a plunger head 27 which snugly fits within the tube and has its forward face disposed substantially in alignment with the forward face of the ejector plate 22. As illustrated, the rods 23 are preferably threaded as at 28 in apertures in the cross head, while the intermediate plunger rod 26 is threaded as at 29 into a central aperture in the cross head and protrudes therebeyond to threadedly receive thereover a combined binding nut and manipulating handle 30.

The device or spearing element B for forming a longitudinal opening through a roll or its equivalent is in the nature of an elongated shank which has a forward end 31 of a reduced diameter with respect to the rear end portion 32, and which forward end portion is joined to the rear end by an intermediate connecting portion 33 of gradually increasing cross sectional size or diameter. Preferably, the forward free end of the leading portion 31 is pointed as at 34 and the rear end is formed with a recess 35, which recess is of a diameter or cross sectional size to snugly receive the outer free open end of the tube 17.

In use and operation, after the device or spearing element B has been passed through the roll C so that the enlarged rear end 32 is disposed therein, the recess 35 is fitted over the outer open free end of the tube 17, as illustrated in Figure 1. The frankfurter or filling D which has been previously arranged within the tube 17 has its rear end disposed in proximity to the plunger which together with the ejector plate 22, is retracted to the position shown in Figure 1. The roll C is now displaced from the device or spearing element B and threaded onto the tube 17, as shown in broken lines in Figure 1. The spearing element or device B is then removed and the operator by moving the cross head 25 forwardly or to the left in Figure 1, strips the roll C and simultaneously ejects the filling D as shown in Figure 2, so that the filling is emplaced in the roll as it is dislodged from the tube, thereby producing the completed sandwich. Before the next roll is perforated and placed on the tube 17, it is obvious that the operator will retract the plunger 27 and ejector plate 22 to the position illustrated in Figure 1 and will swing the movable section 18 to open position to emplace the filling and close said section 18. In forming the opening in the roll, it is obvious that none of the material is wasted or removed, as the spearing element is merely passed therethrough to initially form a small opening which is gradually enlarged by the intermediate flaring portion 33 to the full size of the rear enlarged end 32.

While the device is primarily intended for making frankfurter and roll sandwiches, it is to be understood that any edible casing, such as a roll, and any form of filling are comprehended within the scope of the invention. It is further to be understood that the shape of the tube and the shape of the spearing or piercing device may be varied, and that no limitation is intended to the precise structural details, which may be varied within the scope of the appended claims.

What is claimed is:

1. A device for making sandwiches including a tubular element adapted to receive therein a sandwich filling and adapted to receive thereover a roll having a longitudinal opening for the reception of the filling, means movable longitudinally of the tubular element interiorly and exteriorly thereof for simultaneously displacing the roll and filling from the tubular element and for emplacing the filling within the roll and means for forming the longitudinal opening in said roll comprising a spearing element consisting of a shank having a reduced pointed portion at the leading end, an enlarged portion at the rear end and an intermediate connecting portion of gradually increasing cross sectional size merging said reduced portion into said enlarged portion, the free end of said enlarged portion being of greater cross sectional size than the tubular element and having an axial recess of a size to fit over said tubular element to facilitate the placing of the roll thereon.

2. A device for making sandwiches including a tubular element adapted to receive therein a sandwich filling and adapted to receive thereover a sandwich casing having a longitudinal opening extending completely therethrough for the reception of the filling, said tubular element having a displaceable section for facilitating the introduction of the filling thereto, a casing ejector element movable longitudinally over the tubular element and a plunger movable longitudinally within said tubular element and means connecting said elements for effecting simultaneous movement of the ejector element and plunger to coincidently displace the sandwich casing and filling whereby to effect the emplacement of the filling within the casing.

3. A device for forming a longitudinal opening in a sandwich casing comprising an elongated shank having a reduced leading portion formed with a pointed free extremity, a relatively enlarged rear portion and an intermediate connecting portion of gradually increasing cross sectional size merging said reduced portion into said enlarged portion.

4. A device for forming a longitudinal opening in a sandwich casing comprising an elongated shank having a reduced leading portion formed with a pointed free extremity, a relatively enlarged rear portion and an intermediate connecting portion of gradually increasing cross sectional size merging said reduced portion into said enlarged portion, the free end of said enlarged portion having a recess forming a socket for engagement over a filling device.

5. A device for making sandwiches including a tubular element adapted to receive therein a sandwich filling and adapted to receive thereover a sandwich casing, which casing has extending completely therethrough a longitudinal opening for the reception of the filling, means movable longitudinally of the tubular element interiorly and exteriorly thereof for simultaneously displacing the casing and the filling from the tubular element and for emplacing the filling within the casing and means for forming the longitudinal opening in the casing comprising a spearing element of gradually increasing size from its forward end and so constructed at its rear end as to interfit with the outer end of the tubular element to facilitate the transference of the casing onto the tubular element from the spearing element after the formation of the longitudinal opening in said casing.

LOUIS SCHILLING.